United States Patent
Alberino et al.

[11] 3,929,733
[45] Dec. 30, 1975

[54] POLYCARBODIIMIDES FROM 4,4'-METHYLENEBIS(PHENYL ISOCYANATE) AND CERTAIN CARBOCYCLIC MONOISOCYANATES

[75] Inventors: Louis M. Alberino, Cheshire; William J. Farrissey, Jr., Northford, both of Conn.

[73] Assignee: The Upjohn Company, Kalamazoo, Mich.

[22] Filed: Oct. 2, 1974

[21] Appl. No.: 511,129

[52] U.S. Cl....... 260/77.5 R; 260/2.5 BF; 260/37 N
[51] Int. Cl.² ................................. C08G 18/00
[58] Field of Search......... 260/77.5 R, 2.5 BF, 37 N

[56] References Cited
UNITED STATES PATENTS

| | | | |
|---|---|---|---|
| 2,853,473 | 9/1958 | Campbell et al.............. | 260/77.5 R |
| 3,450,562 | 6/1969 | Hoeschele..................... | 260/77.5 R |
| 3,502,722 | 3/1970 | Neumann........................... | 260/566 |
| 3,755,242 | 8/1973 | Reich............................ | 260/77.5 R |

OTHER PUBLICATIONS
Campbell et al., *J. Org. Chem.* 28, (1963), pp. 2069–2075.
Stille, *Introduction to Polymer Chemistry*, John Wiley & Sons, NY, 1963, pp. 30–32.

*Primary Examiner*—M. J. Welsh
*Attorney, Agent, or Firm*—Denis A. Firth; John Kekich

[57] ABSTRACT

There are described terminated polycarbodiimides having the formula:

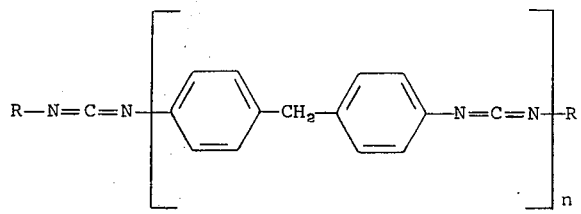

wherein $n$ is an integer having an average value of 6 to 20 and R is phenyl, lower-alkylphenyl, lower-alkoxyphenyl, halophenyl, or cyclohexyl.

The polycarbodiimides possess improved heat stability and moldability compared with closely related urethane terminated polycarbodiimides and possess good physical properties which are retained, and even enhanced, upon subjecting to annealing.

10 Claims, No Drawings

POLYCARBODIIMIDES FROM 4,4'-METHYLENEBIS(PHENYL ISOCYANATE) AND CERTAIN CARBOCYCLIC MONOISOCYANATES

BACKGROUND OF THE INVENTION

1. Field of the Invention

This invention relates to polycarbodiimides and to methods for their preparation and is more particularly concerned with polycarbodiimides derived from a combination of methylenebis (phenyl isocyanate) and a monoisocyanate and with processes for their preparation.

2. Description of the Prior Art

Urethane-terminated polycarbodiimides, obtained by polymerizing a diisocyanate in the presence of a carbodiimide-forming catalyst and reacting the isocyanato-terminated polymer with an alcohol, are described in U.S. Pat. No. 2,941,983 and in J. Organic Chemistry 28, 2069, 1963. The latter reference also discusses the production of corresponding polycarbodiimides which are terminated by reacting the isocyanato-terminated polycarbodiimide with a monoisocyanate so that the polymer contains only carbodiimide linkages. A polycarbodiimide of this type, derived from toluene diisocyanate and terminated by reaction with p-chlorophenyl isocyanate (molar ratio of diisocyanate to monoisocyanate = 58:1), is specifically exemplified. In addition, the formation of a polycarbodiimide of unspecified molecular weight from methylenebis (phenyl isocyanate) and p-tolylisocyanate (molar ratio of diisocyanate to monoisocyanate not specified) is postulated but no preparative details or properties are given.

U.S. Pat. No. 3,450,562 teaches, in broad terms, the preparation of terminated polycarbodiimides by reacting, either sequentially or simultaneously, a diisocyanate and a monoisocyanate in the presence of a carbodiimide-forming catalyst. Example VIII of this patent shows the preparation of two terminated polycarbodiimides. The first one, polycarbodiimide 1, is obtained by heating a mixture of toluene diisocyanate and o-tolylisocyanate (in a molar ratio of 1:1) with a carbodiimide-forming catalyst. The second one, polycarbodiimide 2, is obtained by heating methylenebis (cyclohexyl isocyanate) in the presence of a carbodiimide-forming catalyst and then reacting the isocyanate-terminated polymer with cyclohexyl isocyanate. The molar ratio of diisocyanate to monoisocyanate is 1.5:1.

We have now found that certain terminated polycarbodiimides, which are derived from 4,4'-methylenebis-(phenyl isocyanate) and certain carbocyclic monoisocyanates in carefully chosen proportions, possess especially valuable properties not possessed by the corresponding polycarbodiimides heretofore known and described.

SUMMARY OF THE INVENTION

This invention comprises terminated polycarbodiimides having the formula:

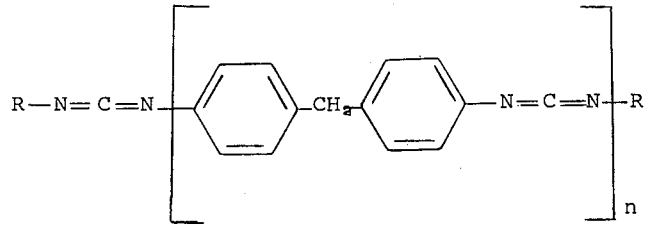

(I)

wherein $n$ is an integer having an average value of 6 to 20 and R is selected from the group consisting of cyclohexyl and

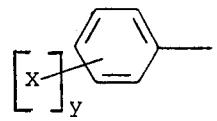

wherein X is a member selected from the group consisting of lower-alkyl, lower-alkoxy and halo, and $y$ is a whole number from 0 to 2.

The term "lower-alkyl" means alkyl from 1 to 6 carbon atoms, inclusive, such as methyl, ethyl, propyl, butyl, pentyl, hexyl, and isomeric forms thereof. The term "lower-alkoxy" means alkoxy from 1 to 6 carbon atoms, inclusive, such as methoxy, ethoxy, propoxy, butoxy, pentyloxy, hexyloxy, and isomeric forms thereof.

The term "halo" is inclusive of chloro, bromo, fluoro and iodo.

The terminated polycarbodiimides having the formula (I) possess excellent structural strength properties, have a glass transition temperature sufficiently low to permit fabrication of a variety of articles therefrom by compression molding techniques, extrusion, and the like, and have excellent thermal stability so that the structural strength properties of the polymers are not adversely affected by the exposure to heat necessary to carry out the fabrication. Indeed the structural strength properties of the polycarbodiimides of formula (I) are enhanced by annealing, i.e. by heating at temperatures in the range of about 150°C to about 250°C for prolonged periods.

Accordingly, the polycarbodiimides (I) of the invention are useful in the fabrication of mechanical parts such as bushings, seal faces, insulators for various electrical components, gears, thread guides, abrasive articles, and the like.

DETAILED DESCRIPTION OF THE INVENTION

The terminated polycarbodiimides (I) of the invention are prepared by methods known in the art for this general class of polymers. Illustratively, the 4,4'-methylenebis-(phenyl isocyanate) is heated at a temperature within the range of about 20°C to about 150°C in the presence of a carbodiimide-forming catalyst until the desired degree of polymerization has occurred. The latter can be determined readily be measuring the amount of carbon dioxide which is evolved; 1 mole of carbon dioxide is evolved in the formation of each molar equivalent of carbodiimide. When the amount of carbon dioxide evolved corresponds to the formation of the required number of carbodiimide linkages the appropriate carbocyclic monoisocyanate, namely, cyclohexyl isocyanate or an isocyanate of the formula

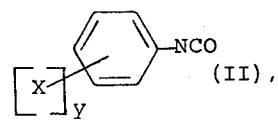

(II), wherein X and y have the significance hereinbefore defined, is added to the reaction mixture (still containing carbodiimide-forming catalyst) in an amount sufficient to condense with the terminal isocyanate groups of the polycarbodiimide to form carbodiimide linkages and thereby terminate the polymer.

Advantageously the above reaction is carried out in the presence of an inert organic solvent, i.e. a solvent which does not enter into reaction with any of the other components of the reaction mixture or otherwise interfere with the desired course of the reaction. Examples of inert organic solvents in which the starting materials are soluble but from which the polymers separate out are benzene, toluene, xylene, decalin, chloroform, methylene chloride, o-dichlorobenzene, monochlorobenzene, and the like.

When using these solvents in carrying out the above process, it is found that the desired polymer generally separates out as a fine powder on cooling the reaction mixture to room temperature (circa 20°C). The higher the molecular weight of the polymer (I), i.e. the higher the value of $n$, the greater the ease with which the polymer precipitates from the final reaction mixture. The separation of the polymer from the reaction product can be facilitated, if necessary, by the addition of a solvent such as hexane, heptane, ligroin, methanol, and the like in which the polymer is insoluble. The addition of the latter solvents to the reaction mixture can be made after the reaction is complete or, alternatively, the solvents in question can be incorporated in a minor amount, i.e. less than 50 percent by volume, into the initial reaction mixture.

In an alternative embodiment of the process described above, one can use an organic polar solvent such as dimethylacetamide, N-methylpyrrolidone, cyclohexanone, and the like, in which the polycarbodiimide (I) is soluble. In such a case the latter can be recovered from the final reaction mixture by addition of a solvent, such as those exemplified above, in which the polycarbodiimide (I) is insoluble.

In an alternative, and preferred, method of preparing the polycarbodiimides (I) of the invention the carbocyclic monoisocyanate (II) is introduced into the initial reaction mixture rather than being added after the polymerization of the 4,4'-methylenebis (phenyl isocyanate) has proceeded to the desired extent. In this preferred mode of operation the desired degree of polymerization is achieved by employing the monoisocyanate, i.e. cyclohexyl isocyanate or the isocyanate (II), and the 4,4'-methylenebis (phenyl isocyanate) in the appropriate ratio. Illustratively, to obtain the polycarbodiimide (I) in which $n$ has the value 6 it is necessary to employ the diisocyanate in a proportion of six (6) equivalents per equivalent of monoisocyanate, i.e. 3 moles of diisocyanate for each mole of monoisocyanate.

It will be appreciated by one skilled in the art that the polycarbodiimides (I) obtained by the above-described process will be a random mixture of terminated polycarbodiimides having different molecular weights (i.e. differing values of $n$) and the formula (I) represents an average composition of the product rather than indicating that the product is a homogeneous one in which all molecules have the same chain length and molecular weight. If desired, the product (I) obtained in accordance with the above-described processes can be separated into fractions of different molecular weight ranges by fractional precipitation, gel permeation chromatography, and the like. Generally speaking, however, the polycarbodiimides (I) are fabricated by compression molding, extrusion, and the like, in the form in which they are isolated from the reaction mixture without further purification or treatment designed to separate the various molecular weight components therein.

Illustrative of the carbocyclic monoisocyanates (II) which are employed in the preparation of the polycarbodiimides (I) are phenyl isocyanate, o-tolylisocyanate, 2,5-diethylphenyl isocyanate, p-hexylphenyl isocyanate, p-methoxyphenyl isocyanate, m-methoxyphenyl isocyanate, 2,5-dimethoxyphenyyl isocyanate, 3-butoxyphenyl isocyanate, 4-hexyloxyphenyl isocyanate, 4-bromophenyl isocyanate, 4-chlorophenyl isocyanate, and the like.

The carbodiimide-forming catalyst which is employed in preparing the polycarbodiimides (I) of the invention can be any of the catalysts conventionally employed in the art to convert organic isocyanates to carbodiimides. Illustratively, there can be employed any of the carbodiimide-forming catalysts set forth in Col. 4, line 15 through Col. 5, line 70 of U.S. Pat. No. 3,723,364. A particularly useful class of carbodiimide-forming catalysts are the phospholene-1-oxides and phospholene-1-sulfides which are described in U.S. Pat. Nos. 2,663,737; 2,663,738, and 2,853,473. Representative compounds within this class are 1-phenyl-2-phospholene 1-oxide, 3-methyl-1-phenyl-2-phospholene 1-oxide, 1-phenyl-2-phospholene 1-sulfide, 1-ethyl-2-phospholene 1-oxide, 1-ethyl-3-methyl-2-phospholene 1-oxide, 1-ethyl-3-methyl-2-phospholene 1-oxide, and the isomeric 3-phospholenes corresponding to all the above-named compounds.

The amount of carbodiimide-forming catalyst employed in the preparation of the polycarbodiimides (I) is generally within the range of about 0.003 to about 0.03 moles per mole of 4,4'-methylenebis(phenyl isocyanate) but higher or lower amounts can be employed depending upon the activity of the particular catalyst chosen.

The polycarbodiimides of the invention, having the formula (I), are amorphous solids characterized by excellent structural strength properties, a glass transition temperature sufficiently low (of the order of 150°C) to permit molding by a variety of techniques, and resistance to degradation on exposure to relatively high temperatures (up to about 250° – 300°C). The polycarbodiimides of the invention are distinguished from the isocyanato-terminated polyycarbodiimides derived from 4,4'-methylenebis(phenyl isocyanate) by the ease with which they can be molded in contrast to the isocyanato-terminated polycarbodiimides which can be molded only with difficulty, if at all. Indeed it is particularly useful to find that the polycarbodiimides of the invention possess structural strength properties which are as good as, if not better than, those of the isocyanato-terminated polycarbodiimides of much higher molecular weight.

The polycarbodiimides (I) of the invention are also distinguished from the corresponding urethane-terminated polycarbodiimides such as those shown in U.S. Pat. No. 2,941,983, by their markedly greater thermal stability. This finding permits the polycarbodiimides (I) to be molded at elevated temperatures by extrusion and like techniques without any significant deterioration in properties in contrast to the urethane-terminated polycarbodiimides which suffer heat degradation under molding conditions. These differences are exemplified by the comparative data set forth in the specific examples below.

The excellent physical properties, ease of moldability and heat stability of the polycarbodiimides (I) make them useful in the fabrication of a wide variety of articles. Illustratively, they can be molded for use as bearings, bushings, various seals, insulators for electrical components, binders for abrasive materials for use in grinding wheels, brake linings, and the like.

The polycarbodiimides (I) can have incorporated in them any of the known reinforcing fillers in order to enhance their structural strength properties in the above applications. The amount of filler can vary from about 5% to about 60% by weight of total composition. Such reinforcing fillers include carbon black, gypsum, natural clays, silica, asbestos, powdered metals such as aluminum, copper and the like, abrasive materials (for use in preparing grinding wheels) and fibers such as fiber glass, asbestos fibers, fibers prepared by extrusion or spinning of synthetic materials such as nylon, polyester and the like and fibers prepared from minerals such as boron, carbon, graphite, beryllium and the like. Such fibrous materials can be employed in short pieces or in chopped form or in the form of webs which are either non-woven, random associations of fibers or are structured assemblies possessing intrinsic strength of their own.

The fillers are introduced into the polycarbodiimides of the invention advantageously by admixture of the filler with a solution of the appropriate polycarbodiimide (I) in a solvent such as dimethylacetamide, N-methylpyrrolidone, and the like, followed by removal of the latter from the mixture and molding of the residue. This technique can also be applied to the preparation of laminates. Thus, sheets of woven fibrous reinforcing material, such as fiber glass, are impregnated with the solvent solution of the polycarbodiimide (I) and the solvent is removed from the impregnated sheets by evaporation under elevated temperature and/or reduced pressure if desired. Two or more layers of impregnated fabric are then assembled in overlapping relationship in a suitable mold and are subjected to heat and pressure to produce the desired laminate. Temperatures of the order of 150°C to 250°C and pressures of the order of 100 psi to 5000 psi are advantageously employed in the molding operation.

The following examples describe the manner and process of making and using the invention and set forth the best mode contemplated by the inventors of carrying out the invention but are not to be construed as limiting.

EXAMPLE 1

A solution of 375 g. (3 equivalents) of 4,4'-methylene-bis(phenyl isocyanate) in a mixture of 1050 ml. of dry benzene and 200 ml. of dry hexane was heated to 70°C and maintained thereat while a total of 35.7 g. (0.3 equivalents) of phenyl isocyanate was added. The mixture was stirred annd maintained at 70°C for a few minutes until the solution was homogeneous and then 6 ml. of a benzene solution containing 1.8 g. of 1-phenyl-2-phospholene 1-oxide was added. Evolution of carbon dioxide began almost immediately. After stirring and maintaining the temperature of the reaction mixture at 70°C for a total of 3 hours, the theoretical amount of carbon dioxide had been collected. The resulting mixture was allowed to stand for 16 hr. at the same temperature (70°C) and then 3 ml. of tosylisocyanate was added to deactivate the 1-phenyl-2-phospholene-1-oxide catalyst. The resulting mixture was allowed to cool to room temperature (circa 20°C) and the solid which separated was isolated by filtration. The filtrate was poured into an excess of hexane and the additional solid which separated was isolated by filtration. The combined precipitates were dried in air overnight and then dried for 4 hours under vacuum at 80°C to obtain 294.8 g. (89% yield) of terminated polycarbodiimide of formula (I) having an average value of $n = 10$, in the form of a powder. The powder showed a weight loss of 0.7 percent at 250°C and a loss of 1.7 percent at 300°C when scanned on a DuPont 950 Thermal Analyzer at 10°C/min. in air.

Samples of the powder were compression molded using a Wabash 30 ton hydraulic press equipped with heated platens. The mold used was an ASTM 5 inches × ½ inch bar mold. A charge of 8 to 9 g. of polymer powder was employed. The platens were preheated to 220°–250°C and the closed mold containing the polymer powder was placed on the platens. The latter were closed to a slight pressure. When the temperature of the mold reached 180°–200°C a pressure of approximately 1000 psi was applied to the mold. The heat was then shut off and the mold was allowed to cool to room temperature under pressure. The molded product was found to have the following properties:

| | |
|---|---|
| Tensile strength,psi | 9780 |
| Tensile modulus,psi | 244,500 |
| Elongation,% | 7 |
| [1]Glass transition temp. °C | 208 |
| Heat deflection temp. at 264 psi (ASTM D-648) | |
| Before annealing: | 159, 162°C |
| After annealing at 150°C for 16 hrs.: | 202, 210°C |

[1]Determined from plot of modulus temperature derived using ASTM D-1053-58T on a modified Gehman Torsion Stiffness Tester.

EXAMPLE 2

A laminate was prepared as follows.

A solution containing 25% by weight of the polycarbodiimide polymer (prepared as described in Example 1) in N-methylpyrrolidone was prepared by adding 40 g. of the powdered polymer portionwise to 120 g. of dry N-methylpyrrolidone with stirring. The slightly hazy solution so obtained was heated to 40° to 50°C to clarify. The solution so obtained was used to coat a piece of fiber glass cloth (E-type: 54 inches × 12 inches: 1581 weave, A–1100 finish) using a fabric coater. The N-methylpyrrolidone was evaporated by heating and the coated fabric was cut into 6 inch × 6 inch squares. Eight squares were placed one on top of the next and stacked between Teflon coated release cloths. The resulting stack was placed between the heated (150°C) platens of a Wabash 30 ton hydraulic press, the Teflon coated release paper being separated from the platens by several layers of glass cloth. Slight pressure was exerted on the press platens while the temperature of the press was raised to 200°C. When this temperature was reached, the slight pressure on the platens was released momentarily and then increased to 500 psi. The heat was shut off and the pressure was maintained until the press temperature had fallen to 100°C. The laminate was removed from the press and found to have the following properties:

| Flexural strength: | psi |
| --- | --- |
| at 70°F | 49,480 |
| 400°F | 37,800 |
| 450°F | 2,080 |

| Flexural modulus: | psi |
| --- | --- |
| 70°F | $2.52 \times 10^6$ |
| 400°F | $2.26 \times 10^6$ |
| 450°F | $0.174 \times 10^6$ |

EXAMPLE 3

Using the procedure described in Example 1, but reducing the amount of phenyl isocyanate to 17.9 g. (0.15 equivalents) there was obtained a terminated polycarbodiimide of formula (I) wherein $n$ has an average value of 20. The yield of polymer was 311.3 g. (95.8% yield). The properties of this polymer, after molding as a bar as described in Example 1, were found to be as follows:

| | | |
| --- | --- | --- |
| Tensile Strength, psi | : | 9723 |
| Tensile Modulus, psi | : | 204, 300 |
| Elongation, % | : | 6.3 |
| ¹Glass transition temp. °C | : | 212 |

¹See Example 1

EXAMPLE 4

This example shows for purposes of comparison, two polycarbodiimides which have lower and higher degrees of polymerization than the polycarbodiimides of the invention but which otherwise correspond thereto.

a. A solution of 43.7 g. (0.35 equiv.) of 4,4'-methylenebis(phenyl isocyanate) in 500 ml. of anhydrous dry xylene was heated under nitrogen to 120°C and 8.13 g. (0.068 equiv.) of phenyl isocyanate was added. The resulting mixture was stirred at 120°C while 0.1 ml. of 3-methyl-1-phenyl-2-pholene-1-oxide was added and the resulting mixture was stirred at the same temperature for approximately four hours until evolution of carbon dioxide ceased. The resulting product was cooled to room temperature (circa 20°C) and the solid (Fraction A) which separated (10.3 g.) was isolated by filtration. The filtrate was poured into an excess of hexane and the solid (Fraction B) which separated (22 g.) was isolated by filtration. The total yield of solid so isolated was only 68% theoretical, the remainder of the product being solvent soluble. The isolated product was a polycarbodiimide corresponding to formula (I) but having an average value of $n = 5.1$. Fraction B was found to have a glass transition temperature of 182°C, i.e. significantly lower than the polycarbodiimides of Examples 1 and 3.

The above experiment was repeated with the sole exception that the xylene was replaced by chloroform as solvent. The reaction product was evaporated to dryness to give a 99% theoretical yield of solid having a softening point of circa 50°C which was of little value for molding purposes.

b. The procedure set forth in part (a) above was repeated (using xylene as solvent) using 50 g. (0.4 equiv.) of 4,4'-methylenebis(phenyl isocyanate), 1 g. (0.0084 equiv.) of phenyl isocyanate and 0.2 ml. of 1-phenyl-2-pholene-1-oxide. The polycarbodiimide began separating from the reaction mixture after about 3 hours of heating. The reaction mixture was thereupon cooled to room temperature (circa 20°C) and the solid which separated was isolated by filtration and dried in a vacuum oven at 100° – 110°C for several hours. The product so obtained was a polycarbodiimide corresponding to the formula (I), but having an average value of $n = 47.6$. Thermal gravimetric analysis at 15°C/minute in air on a DuPont 950 Thermal Analyzer showed a 0.2 percent weight loss at 250°C and 0.6% weight loss at 300°C.

The polycarbodiimide prepared above could be compression molded at 200°C and 2500 psi but not at lower temperatures. The glass transition temperature was found to be 210°C but, unlike the polycarbodiimides of the invention, this polycarbodiimide does not remain processable at temperatures above the glass transition temperature but showed increased stiffness and poor flow properties at such temperatures. In contrast to the polycarbodiimides of the invention, the polycarbodiimide prepared as described above could not be extruded.

EXAMPLE 5 a. A polycarbodiimide, corresponding in all respects to that prepared as described in Example 1 except that the terminal groups were urethane, was prepared as follows:

A mixture of 50 g. (0.4 equivalents) of 4,4'-methylenebis(phenyl isocyanate) in 175 g. of dry benzene was heated to 50°C and 0.2 g. of 3-methyl-1-ethyl-2-pholene-1-oxide was added with stirring. The resulting mixture was stirred and maintained at 50°C and the amount of carbon dioxide evolved was measured. At the end of three hours 86.2% of the theoretical amount of carbon dioxide was collected.

At this time 9.2 g. (0.2 equivalents) of ethanol was added and the mixture was stirred for 20 minutes at 50°C. An additional amount of $CO_2$ was collected. The total now amounted to 87.3% of theory. This corresponded to approximately 7.8 carbodiimide units per average chain ($n = 7.8$). The mixture was cooled to room temperature and left to stand overnight. The resulting solution was then poured with stirring into an excess of hexane. The solid which separated was isolated by filtration and dried in a vacuum oven at 50°C and finally in an air oven at 85°C. The resulting powder was a urethane-terminated polycarbodiimide having approximately 7.8 carbodiimide groups per molecule. A sample of the powder showed a weight loss of 2.2% at 250°C and a weight loss of 5.2% at 300°C when scanned on a DuPont 950 Thermal Analyzer at 10°C/min. in air.

A sample of the powder was molded using the technique described in Example 1. The molded piece had a $T_g = 164°C$ when tested as in Example 1. The piece bubbled severely at 200° – 220°C during the test. When an attempt was made to anneal another sample at 150°C in a vacuum oven, the sample bubbled and was no longer useful for testing. It could, therefore, not be annealed.

b. For comparison purposes, a second urethane-terminated polycarbodiimide was prepared in which the ethanol used to terminate the polymer was added to the initial reaction mixture in analogous manner to the procedure set forth in Example 1 for the preparation of a polycarbodiimide of the invention.

To a solution of 50 g. (0.4 equiv.) of 4,4'-methylenebis(phenyl isocyanate) in 175 g. of anhydrous benzene was added 1.84 g. (0.04 equiv.) of absolute ethanol. The temperature was raised to 50°C with stirring and 0.51 g. of 3-methyl-1-phenyl-2-phospholene-1-oxide in 3 ml. of anhydrous benzene was added. The resulting mixture was maintained at 50°C with stirring for approximately four hours until evolution of carbon dioxide ceased. The product so obtained was cooled to room temperature and poured into excess hexane. The resulting precipitate was isolated by filtration, dried in air and finally in vacuo at 90°C for approximately 12 hr. There was thus obtained 41.4 g. (94.3% theory) of a urethane-terminated polycarbodiimide. This product showed a 3 percent weight loss at 250°C and a 6.2 percent weight loss at 300°C when scanned on a DuPont 950 Thermal Analyzer at 10°C/minute in air.

A sample of the powder was molded as described in Example 1. The molded specimen was placed in a vacuum oven at 150°C overnight to anneal same. The molded specimen so obtained exhibited a number of small bubbles therein. The bubbles were sufficiently numerous as to render meaningless any testing of structural strength properties. The same specimen was then placed in an air oven at 200°C for a short period. Severe bubbling occurred and the specimen puffed up to a spherical shape.

EXAMPLE 6

A polycarbodiimide of the invention having the formula (I) where R = o-tolyl and $n$ has an average value of 15 was prepared as follows:

A solution of 50 g. (0.4 equiv.) of 4,4'-methylenebis-(phenyl isocyanate) in 200 ml. of anhydrous benzene was heated to 75°C and 3.5 g. (0.026 equiv.) of o-tolyl isocyanate was added with stirring followed by 0.15 g. of 3-methyl-1-phenyl-2-phospholene 1-oxide. The mixture was maintained at the above temperature with stirring for approximately five hours until evolution of carbon dioxide ceased. The resulting product was allowed to cool to room temperature and then poured into 1000 ml. of hexane. The polycarbodiimide separated as a sticky solid which coagulated. The coagulated material was chopped in a blender, washed with 200 ml. of hexane, chopped again and dried in a vacuum oven at 80° to 110°C. There was thus obtained 40.6 g. (92 percent theory) of the desired polycarbodiimide. This material lost 0.2 percent in weight at 250°C and 0.6 percent at 300°C when scanned at 15°C/minute on a DuPont 950 Thermal Analyzer in air.

A sample of the polycarbodiimide was molded as described in Example 1. The molded specimens were annealed in vacuum at 150°C for 24 hours without showing any signs of bubbling. The tensile strength (average of four specimens) was 10,930 psi. The glass transition temperature of the polycarbodiimide was 218°C.

EXAMPLE 7

Using the same procedure as set forth in Example 6, but replacing the o-tolyl isocyanate by 3.87 g. (0.026 equivs.) of p-methoxyphenyl isocyanate, there was obtained 43.8 g. (98 percent theory) of a polycarbodiimide of formula (I) wherein R = p-methoxyphenyl and $n$ has an average value of 15. This material showed no loss in weight at 250°C and 1.2 percent at 300°C when scanned at 15°C/minute on a DuPont 950 Thermal Analyzer in air.

Samples of the polycarbodiimide were molded as described in Example 1 and found to have a tensile strength (average of four) of 11,250 psi. After annealing the specimens for 24 hours at 160°C the average tensile strength was 11,150 psi.

EXAMPLE 8

Using the same procedure as set forth in Example 6, but replacing the o-tolyl isocyanate by 3.93 g. (0.026 equiv.) of 2,6-diethylphenyl isocyanate, there was obtained 42.5 g. (95 percent theory) of a polycarbodiimide of formula (I) wherein R = 2,6-diethylphenyl and $n$ has an average value of 15. This material showed no weight loss at 25°C and a 0.2 percent weight gain at 300°C when scanned at 15°C/minute on a DuPont 950 Thermal Analyzer in air. The glass transistion temperature of the material was 211°C.

We claim:

1. A terminated polycarbodiimide having the formula:

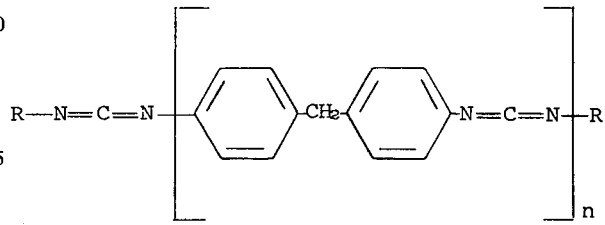

wherein $n$ is an integer having an average value from 6 to 20 and R is selected from the group consisting of cyclohexyl and

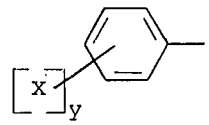

wherein X is a member selected from the group consisting of lower-alkyl, lower-alkoxy, and halo, and $y$ is a whole number from 0 to 2.

2. A terminated polycarbodiimide having the formula:

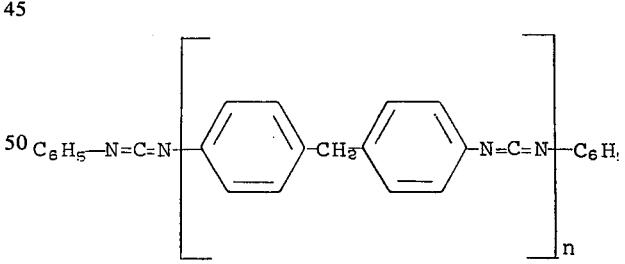

wherein $n$ is an integer having an average value from 6 to 20.

3. A terminated polycarbodiimide according to claim 2 wherein $n$ has an average value of 10.

4. A terminated polycarbodiimide according to claim 2 wherein $n$ has an average value of 20.

5. A polycarbodiimide according to claim 1 wherein R represents o-tolyl.

6. A polycarbodiimide according to claim 1 wherein R represents p-methoxyphenyl.

7. A polycarbodiimide according to claim 1 wherein R represents 2,6-diethylphenyl.

8. A composition comprising a polycarbodiimide as defined in claim 1 and a reinforcing filler.

9. A composition according to claim 8 wherein the reinforcing filler is fibrous.

10. A composition according to claim 9 in the form of a laminate.

* * * * *

UNITED STATES PATENT OFFICE
CERTIFICATE OF CORRECTION

Patent No. 3,929,733      Dated December 30, 1975

Inventor(s) Louis M. Alberino and William J. Farrissey, Jr.

It is certified that error appears in the above-identified patent and that said Letters Patent are hereby corrected as shown below:

Column 10, Claim 2, Line 50:      Should read:

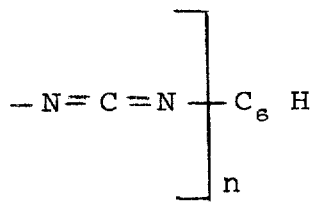 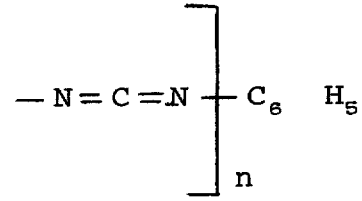

Signed and Sealed this fourth Day of May 1976

[SEAL]

Attest:

RUTH C. MASON  
Attesting Officer

C. MARSHALL DANN  
Commissioner of Patents and Trademarks